Oct. 19, 1965 L. W. SCHMIDT 3,212,588
COMPENSATING DRAFT UNIT
Filed Jan. 2, 1963 2 Sheets-Sheet 1
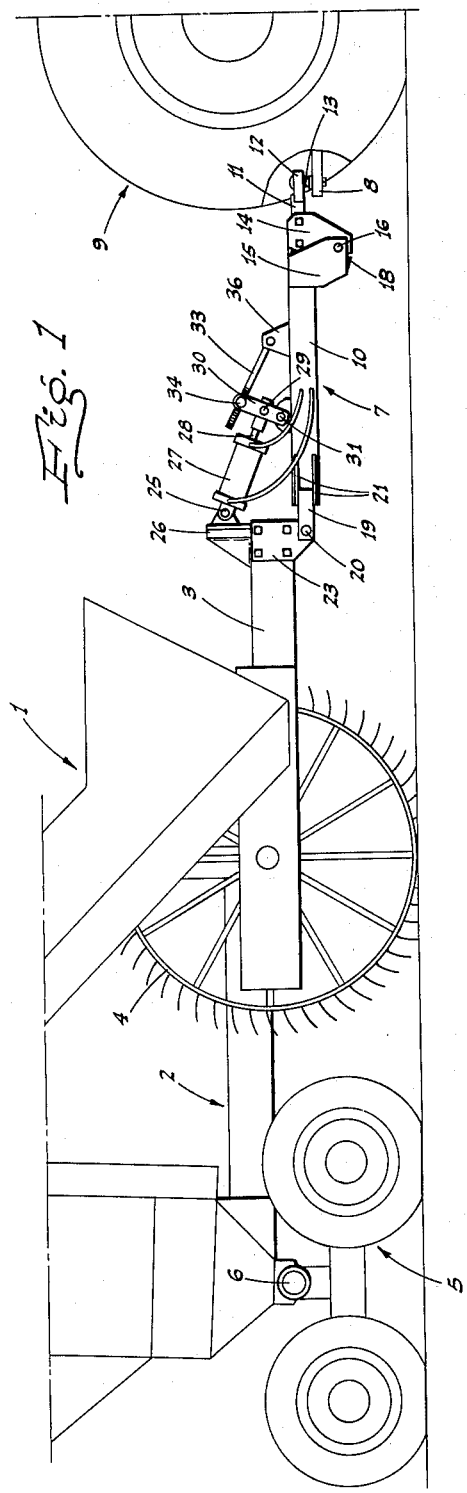
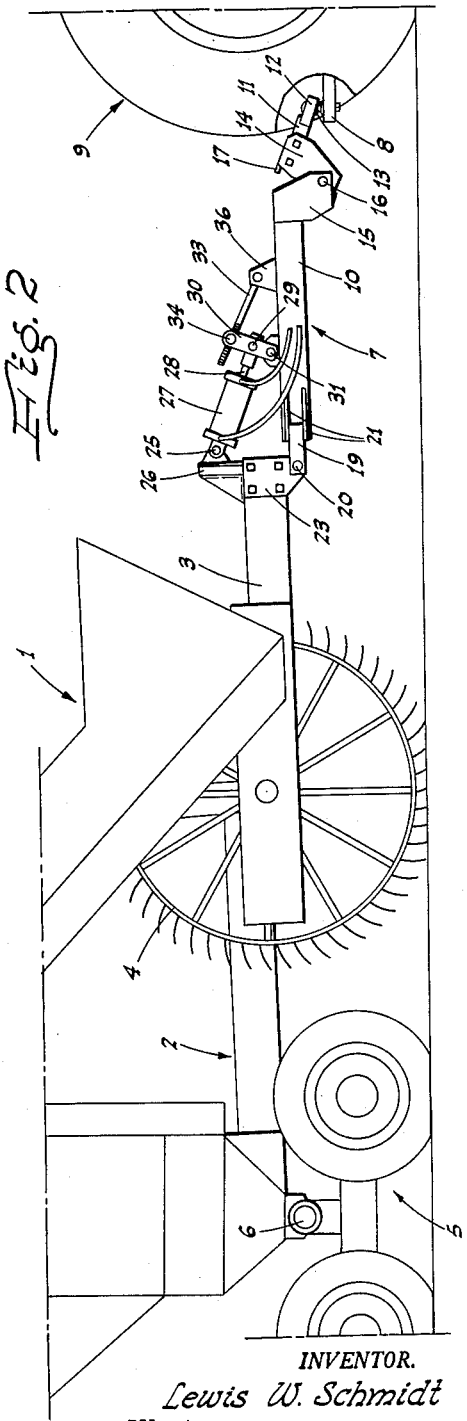
INVENTOR.
Lewis W. Schmidt
BY
Webster & Webster
ATTYS.

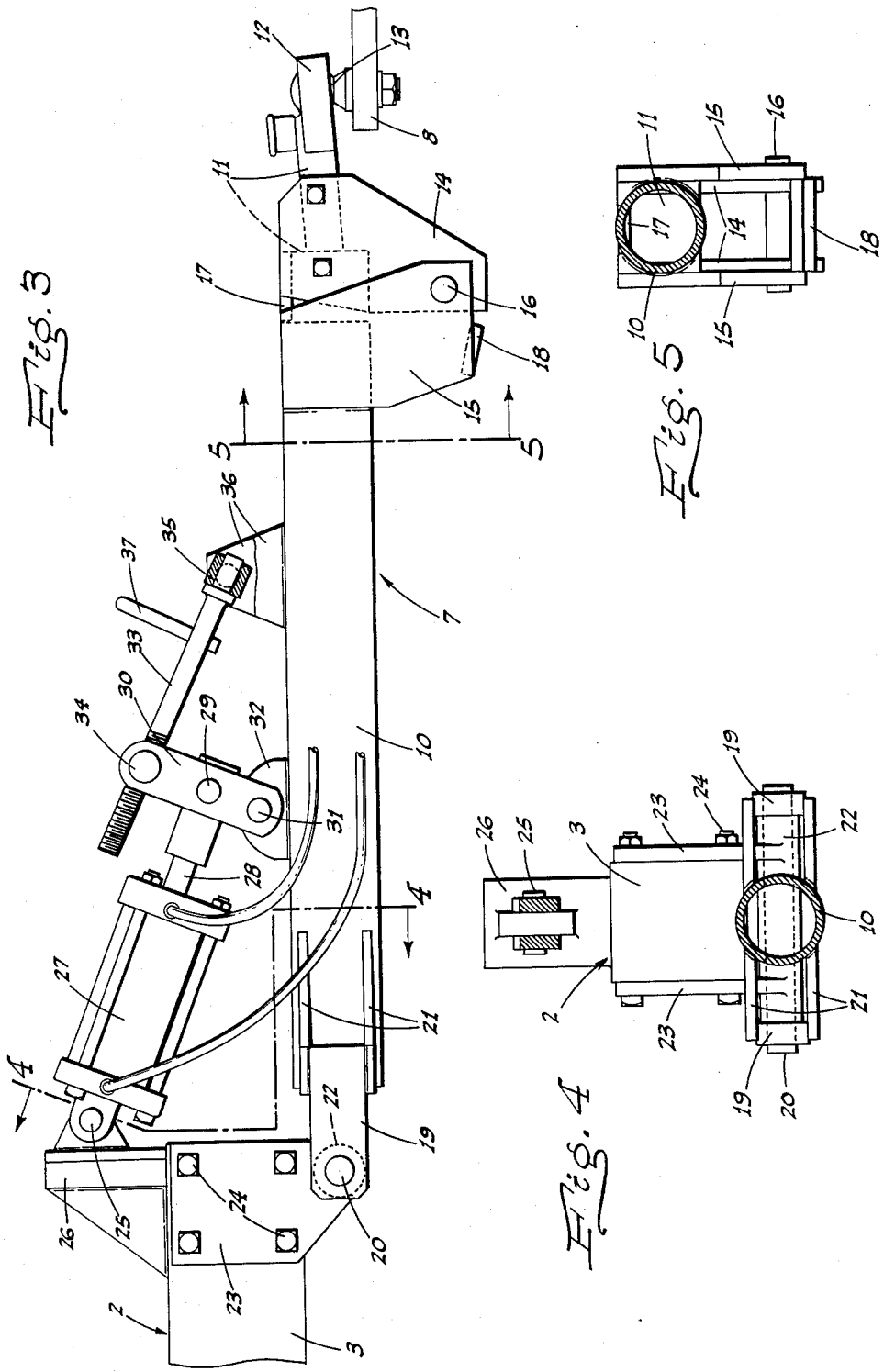

United States Patent Office 3,212,588
Patented Oct. 19, 1965

3,212,588
COMPENSATING DRAFT UNIT
Lewis Wallace Schmidt, Rio Vista, Calif., assignor, by direct and mesne assignments, of sixteen percent each to Lloyd K. Schmidt, Albert M. Jongeneel, Lewis W. Schmidt, and Claude A. Loucks, ten percent to George C. Gordon and Ernest F. Blackwelder, eight percent to Daniel P. Newell, and one and one-third percent each to Pliny G. Holt, Frank H. Holt, Richard E. Holt, Harriet H. Shelton, Frank A. Guernsey, and Darius A. Guernsey
Filed Jan. 2, 1963, Ser. No. 248,950
1 Claim. (Cl. 172—239)

This invention relates to wheel-supported ground-working implements, and to the draft tongues therefor and by means of which such implements are drawn along the ground.

Such an implement, of one type or another, includes a rigid frame from which the ground engaging tool depends, and which frame is pivotally mounted in connection with the supporting wheels at a point rearwardly of the tool.

A major object of this invention is to provide a compensating draft unit, adapted for connection between such frame and a draft tractor, which is so constructed that if the tool, when in the ground, offers an excessive resistance to forward movement of the implement for one reason or another, the implement frame will be automatically lifted about its pivotal mount as an axis sufficiently to raise the tool somewhat and thereby reduce the resistance thereof.

A further object of the invention is to connect the draft unit to the front end of the implement, and to the drawbar of the tractor, in such a manner that the tool may be set to operate at different depths, as may be desired, without affecting the automatic raising of the tool from such depth and as may occur during operation of the implement.

In connection with this feature, it is another object of the invention to provide means, connected between the draft unit and the implement frame, and operable separately from the tool setting means above noted, whereby the tool may be raised entirely clear of the ground whenever desired, without affecting the set position of the tool when the functioning of said means is discontinued and the tool is returned to its working position.

It is also an object of the invention to provide a practical, reliable, and durable compensating draft unit, and one which will be exceedingly effective for the purpose for which it is designed.

These objects are accomplished by means of such structure and relative arrangements of parts as will fully appear by a perusal of the following specification and claim.

In the drawings:

FIG. 1 is a side elevation of the improved compensating draft unit as connected between a tractor and a beet harvester; the latter being shown somewhat diagrammatically, and the harvester and draft unit being shown in a normal operating position.

FIG. 2 is a similar view, but shows the draft unit as functioning to cause the ground engaging tool of the harvester to be raised somewhat due to an excessive draft load having been placed on the tractor by such tool.

FIG. 3 is an enlarged side elevation of the draft unit in a normal position.

FIG. 4 is a cross section on line 4—4 of FIG. 3.

FIG. 5 is a cross section on line 5—5 of FIG. 3.

Referring now more particularly to the drawings, and to the characters of reference marked thereon, the implement to which the compensating draft unit is applied is here shown as being a beet harvester, indicated generally at 1. Such harvester includes a longitudinal frame structure, indicated generally at 2, and terminating at its forward end in a central beam 3. Supported by the frame structure intermediate its ends is at least one spiked, beet pick-up wheel 4 which comprises the working tool of the implement.

The frame structure 2, which is rigid from end to end, is—in the present instance—supported at its rear end from a ground engaging bogie truck 5 by means of a transverse pivot unit 6 on such truck.

The compensating draft unit, indicated generally at 7, is interposed between the front end of beam 3 of the harvester frame structure 2 and the drawbar 8 of the draft tractor indicated at 9.

The compensating draft unit 7 comprises a main elongated rigid tongue 10 which forms the rear portion of the unit, and a short rocker tongue 11 which forms the forward portion of the unit. The tongue 11, at its forward end, is provided with a socket member 12 of a conventional ball and socket hitch or coupling, the ball 13 of which is mounted on the drawbar 8.

The tongue 11 at its rear end is provided on opposite sides with depending plates 14, which are partially overlapped by similar plates 15 depending from the forward end of the tongue 10. A transverse pivot pin 16 is mounted in and connects all of the plates adjacent their lower ends, as clearly shown.

At their adjacent ends the tongues are normally held from buckling downwardly about the pin 16 as an axis by suitable means such as a projecting lug 17 on top of tongue 11 and abutting tongue 10; said tongues however remaining capable of relative upward buckling about said pin 16. The extent or degree of such upward buckling is limited by a cross bar 18 extending between and secured to the plates 15 at their lower ends, below the pin 16 and back from the rear edges of the plates 14 for abutment thereagainst but normally spaced rearwardly therefrom.

At its rear end the tongue 10 is provided with rearwardly extending supporting ears 19 for a transverse pivot shaft 20; said ears being spaced and held laterally out from the tongue by means of upper and lower gussets 21 secured to the forward portion of the ears and to the rear portion of the tongue 10. A sleeve 22 is turnable on the shaft 20, and plates 23 are rigid with and upstand from the sleeve in transversely spaced relation to abut against the opposite sides of the central beam 3 of the harvester frame structure, and to which beam 3 the plates 23 are secured by bolts 24.

The compensating draft unit 7 is thus inherently capable of swinging in a vertical plane about the shaft 20 as an axis, but is normally yet adjustably held rigid with the beam 3 by the following means:

Pivoted, as at 25, on a support 26 upstanding from and rigid with the beam 3 at its forward end is a hydraulic cylinder 27 extending forwardly with a downward slope, with the normally retracted forwardly projecting piston rod 28 pivotally connected, as at 29, between upstanding arms 30 intermediate the ends thereof. The arms 30, at their lower ends, are connected by a transverse pivot pin 31 which is mounted in a supporting ear 32 upstanding from the tongue 10.

In order to maintain the upstanding arms 30 in a rigid but adjustable position relative to the tongue 10, a screw rod 33 is threaded through a boss 34 turnably mounted in and extending between said arms at their upper end. Said rod 33 extends forwardly from the arms 30 with a downward slope, and at its forward end is turnably mounted and anchored in a block 35 disposed between and swivelly mounted in bracket ears 36 secured on and upstanding from the tongue 10. A radial handle 37 is mounted on the rod 33 near but clear of said ears in order that said rod may be easily turned for adjustment purposes.

By means of this arrangement, with the draft unit 7 pivoted at its forward end on the coupling ball 13, and with the harvester frame structure 2 supported on the rear end pivot unit 6, swinging movement of the arms 30 by means of the screw rod 33, while maintaining the piston rod 28 in its fully retracted position, will cause vertical adjustment of said frame structure 2, thus setting the depth at which the pick-up wheel 4 will work; the frame structure remaining in such adjusted position while normal harvesting operations are in progress.

Upon a pressure fluid being admitted to the rear end of the cylinder 27, the piston rod 28 will be extended, causing an upward buckling of the harvester frame structure 2 and the draft unit 7, so as to raise the pick-up wheel 4 clear of the ground, as when the harvester is being transported from place to place, or is being turned at the end of a row of beets being harvested.

With pick-up wheel 4 set at any desired working depth, and with normal draft load on the tractor, the tongues 10 and 11 remain in their normal substantially alined positions, as in FIG. 1; the tractor pull being transmitted directly from the tractor drawbar coupling to the rear pivot unit 6 of the harvester frame structure 2.

If, however, the pick-up wheel 4 encounters excessive resistance, and as a result the draft load on the tractor then exceeds the desired or normal amount, an increased pull will be transmitted through the pivot pin 16 which connects plates 14 and 15 below the tongues 10 and 11. Such increased pull results in the pivot pin 16 moving upwardly and the plates 14 and 15 relatively pivoting in a separating direction. This produces an upward buckling of the tongues relative to each other, the tongue 11 swinging upwardly about the hitch ball 13 as an axis, while the tongue 10 and the frame structure 2 which is rigid therewith swing upwardly about the rear pivot unit 6 as an axis; all as shown in FIG. 2. As a result, the pick-up wheel 4 is lifted sufficiently to eliminate the excessive resistance from the pick-up wheel 4 and relieve the above normal draft load on the tractor. As soon as the cause of such excessive resistance has passed and the tractor continues to advance under normal draft load, the weight factor causes the tongues to reassume their initial normal positions, and the pick-up wheel 4 reassumes its normal operating depth.

It is to be noted that while a beet harvester is here shown and described as being the implement to which the compensating draft unit is attached, and the tool of such implement is a beet pick-up wheel, the implement and its tool may actually be of various kinds, as long as the implement frame is mounted for up and down movement about a pivotal axis disposed rearward of the tool.

From the foregoing description it will be readily seen that there has been produced such a device as will substantially fulfill the objects of the invention, as set forth herein.

While this specification sets forth in detail the present and preferred constructon of the device, still in practice such deviations from such detail may be resorted to as do not form a departure from the spirit of the invention, as defined by the appended claim.

Having thus described the invention, the following is claimed as new and useful, and upon which Letters Patent are desired:

In combination, an implement having a longitudinal frame structure, a ground engaging tool depending from the frame structure intermediate its ends, and a wheel unit at the rear end of the frame structure including transverse pivot means from which the frame structure is supported for swinging movement in a vertical plane; a compensating draft unit extending forwardly from the frame structure and adapted at its forward end for swivel connection with the drawbar of a tractor, and means normally rigidly connecting the draft unit at its rear end to the frame structure at its forward end; there being means incorporated in the draft unit whereby upon the tool offering excessive resistance to forward movement of the implement and tractor, the implement frame structure will be swung upwardly about the pivot means and the tool lifted sufficiently to reduce the resistance offered thereby; the draft unit embodying front and rear tongue portions normally substantially alined, and the last named means comprising plates on opposite sides of the front tongue portion at its rear end rigid therewith and depending therefrom, other plates on opposite sides of the rear tongue portion at its forward end rigid therewith and depending therefrom in overlapping relation to the first named plates, a transverse pivot pin connecting the plates at their lower ends, a stop lug fixed with and projecting rearwardly from the rear end of the front tongue portion at the top thereof and between the related plates for engagement with the forward end of the rear tongue portion, and a cross bar extending between and rigid with said other plates rearwardly of the first named plates and below the pivot pin; said cross bar being adapted for engagement with the rear edges of said first named plates but being spaced rearwardly therefrom when the lug is engaged with the rear tongue portion.

References Cited by the Examiner

UNITED STATES PATENTS

| | | | |
|---|---|---|---|
| 2,256,563 | 9/41 | Kamplade | 172—323 |
| 2,325,882 | 8/43 | Scarlett | 172—323 |
| 2,358,281 | 9/44 | Ray | 172—239 |
| 2,586,919 | 2/52 | Court | 172—239 |
| 2,773,704 | 12/56 | Saxon | 280—489 |
| 2,971,591 | 2/61 | Silver et al. | 172—239 X |
| 2,972,383 | 2/61 | Erdman | 171—58 |

FOREIGN PATENTS

| | | |
|---|---|---|
| 224,641 | 11/24 | Great Britain. |
| 302,391 | 12/28 | Great Britain. |
| 174,351 | 2/61 | Sweden. |

ABRAHAM G. STONE, *Primary Examiner.*